United States Patent
Sugimoto

(10) Patent No.: US 7,773,823 B2
(45) Date of Patent: Aug. 10, 2010

(54) IMAGE PROCESSING METHOD, APPARATUS, AND PROGRAM

(75) Inventor: Yusuke Sugimoto, Kanagawa-ken (JP)

(73) Assignee: FUJIFILM Corporation, Tokyo (JP)

( * ) Notice: Subject to any disclaimer, the term of this patent is extended or adjusted under 35 U.S.C. 154(b) by 1070 days.

(21) Appl. No.: 11/480,471

(22) Filed: Jul. 5, 2006

(65) Prior Publication Data

US 2006/0251335 A1    Nov. 9, 2006

(30) Foreign Application Priority Data

Jul. 4, 2005    (JP) ............................. 2005-194653

(51) Int. Cl.
*G06K 9/40* (2006.01)

(52) U.S. Cl. .................. 382/254; 382/260; 382/275

(58) Field of Classification Search .............. 382/254, 382/260, 275, 266; 345/611, 428, 150; 358/167, 358/37

See application file for complete search history.

(56) References Cited

U.S. PATENT DOCUMENTS

| | | | | |
|---|---|---|---|---|
| 4,594,607 A | * | 6/1986 | Lewis et al. ................. | 348/639 |
| 5,196,935 A | * | 3/1993 | Cremonesi et al. .......... | 348/624 |
| 5,619,230 A | * | 4/1997 | Edgar ......................... | 345/597 |
| 5,715,014 A | * | 2/1998 | Perkins et al. ................ | 725/28 |
| 7,136,079 B2 | * | 11/2006 | Luo et al. .................... | 345/611 |
| 7,426,313 B2 | * | 9/2008 | Shohdohji .................... | 382/260 |
| 7,529,425 B2 | * | 5/2009 | Kitamura et al. ............ | 382/275 |
| 2002/0089608 A1 | * | 7/2002 | Yamamoto et al. .......... | 348/725 |
| 2003/0156761 A1 | * | 8/2003 | Ogata et al. ................. | 382/251 |
| 2007/0041640 A1 | * | 2/2007 | Tabata et al. ................ | 382/173 |

FOREIGN PATENT DOCUMENTS

JP    11-201864 A    7/1999

* cited by examiner

*Primary Examiner*—Brian Q Le
*Assistant Examiner*—Mekonen Bekele
(74) *Attorney, Agent, or Firm*—Sughrue Mion, PLLC

(57) ABSTRACT

An image processing apparatus capable of eliminating noise from a digital image with edges maintained intact. The apparatus includes: an input means for accepting a digital image; a noise amount determination unit for determining the amount of noise in the digital image, and setting noise elimination power; a noise suppression unit for eliminating the noise from the digital image based on the noise elimination power; and an output means for outputting the noise suppressed digital image. The noise amount determination unit includes: a chrominance component separation unit for separating chrominance components from the digital image; a frequency transformation unit for transforming each of the separated chrominance components into the frequency domain; and a noise elimination power setting unit for calculating the amount of noise in each chrominance component transformed into the frequency domain, and setting the noise elimination power according the calculated amounts of noise.

12 Claims, 2 Drawing Sheets

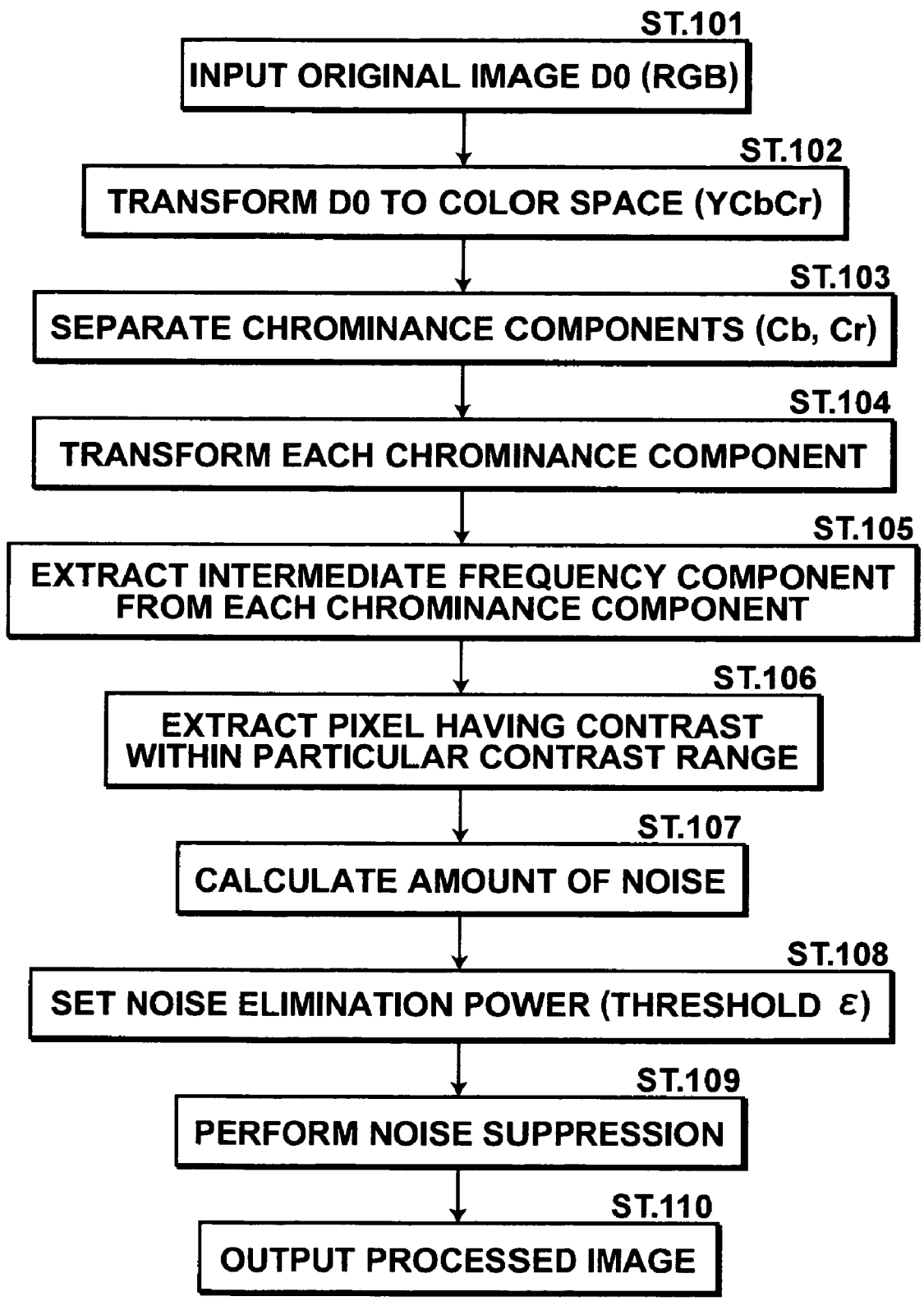

IMAGE PROCESSING METHOD, APPARATUS, AND PROGRAM

BACKGROUND OF THE INVENTION

1. Field of the Invention

The present invention relates to an image processing apparatus and method capable of suppressing noise in a digital image with edges maintained intact. The present invention further relates to a program for causing a computer to execute the method.

2. Description of the Related Art

Recently, digital still cameras (digital camera) have been spreading rapidly. The digital cameras focus an optical image on a digital device (such as a CCD, photoelectron multiplier tube, or the like) instead of on a silver halide film, and the image may be recorded on a recording medium as digital data (digital image) or used directly by a computer. Thus, they are useful for recording digital images after performing image processing thereon, or the like.

Further, it is often the case in which images obtained by the conventional method of focusing them on a silver halide film, or those obtained by printing on a printing medium, such as a photo paper, paper, or the like, are read out by a readout device such as a scanner or the like. Then, the digital data so obtained are recorded or subjected to image processing like the images obtained by digital cameras.

Such digital images are reproduced as images displayed on a display unit, printed on a photo paper, or the like. The reproduced images are expected to have a high image quality so that various image processing techniques need to be performed on the digital images.

Of the image processing techniques, noise suppression for a digital image has a greater impact on the quality of the processed image, so that various techniques are proposed. Generally, a low pass filter (LPF) is used for suppressing the noise. The LPF, however, has a drawback that it degrades edges in the image signals and the entire image is blurred, although it suppresses the noise in the image. Therefore, it is desirable to balance between the noise suppression and prevention of edge degradation by figuring out the noise level of the image and regulating the noise suppression level.

Conventionally, the criteria for noise level assessment include RMS granularity that uses the standard deviation of density, or Wiener spectrum obtained by Fourier transforming the density variation. The noise suppression methods using these criteria include, for example, a method in which a chart without density variation is imaged by a digital camera, and RMS granularity or Wiener spectrum is calculated to obtain the noise characteristic of the digital camera. Thereafter, when performing noise suppression on an image obtained by the digital camera, the noise suppression is performed by predicting the noise level of the image based on the noise characteristic of the digital camera obtained in advance.

Another noise suppression method is also proposed. In the method, a flat region is extracted from an objective image itself to obtain the noise level, which is used as the noise level of the image.

In the mean time, the luminance component of an image constituting the edge components of the image greatly contributes to the human vision. Therefore, when performing noise suppression on an image, it is desirable to perform the noise suppression by obtaining the noise level of the luminance component. Japanese Unexamined Patent Publication No. 10(1998)-003539 discloses a noise suppression method, in which the directional differential is taken for each pixel in an image to extract the edge component at the pixel position, and determination is made if it is an edge or noise based on the edge ratio to regulate the noise suppression level.

The methods for suppressing the noise includes, for example, a method that makes use of the fact that most of the noise components present in a high frequency component of an image as small amplitude signals, and uses a two dimensional $\epsilon$-filter to separate and remove the small amplitude high frequency noise. As described earlier, the LPF commonly used for noise suppression may suppress the noise component, but at the same time degrade edges in the signals, thereby entire image is blurred. In contrast, the $\epsilon$-filter has a property to smooth only the variation of a small amplitude signal waveform, so that the application of the $\epsilon$-filter to an image allows the edges involving steep level variations to be maintained, and the sharpness of the entire image remains substantially intact. Basically, the $\epsilon$-filter behaves such that a nonlinear transformation function is applied to the level variation of amplitude in the high frequency component of an image, and the value obtained thereby is subtracted from the original image signal. The nonlinear transformation function is a function that makes the output zero if the signal amplitude is greater than a predetermined threshold value. That is, if the $\epsilon$-filter is applied, the output of the nonlinear transformation function is zero in the area of an image where the amplitude is greater than the predetermined threshold value, and the original signal is maintained in the processed image, while in the area where the amplitude is smaller than the predetermined threshold value, the signal value thereof becomes the value obtained by subtracting the output value of the nonlinear transformation function (absolute value is greater than zero) from the original signal value. This allows the area having noise (area where the amplitude is smaller than the threshold value) to be smoothed, and the higher amplitude edge area (area where the amplitude is greater than the threshold value) to be maintained. The threshold value used in the method is the parameter for distinguishing between edge and noise areas.

As described above, the use of the $\epsilon$-filter, for example, may satisfy both the noise suppression and edge maintainability. The performance of the $\epsilon$-filter, however, is greatly influenced by the threshold value set for distinguishing between noise and edge areas. An inappropriately set threshold value may cause adverse effects, such as insufficient noise suppression, or blurred image (dull edge) due to erroneous suppression of the edge area as noise. Therefore, how to set an appropriate threshold value is a challenging problem. Further, the use of a filter, such as E-filter, median filter or the like which is expected to have the identical effect to that of the $\epsilon$-filter for noise suppression, how to set an appropriate threshold value is still a challenging problem.

In view of the circumstances described above, it is an object of the present invention to provide an image processing method and apparatus having high noise suppression and edge maintenance capabilities achieved by determining the amount of noise in image data, setting an appropriated threshold value used for distinguishing between the noise and edge areas according to the noise amount determination result, and performing noise suppression using a filter with the threshold value set on the filter. It is a further object of the present invention to provide a program for causing the image processing apparatus to execute the image processing method of the present invention.

SUMMARY OF THE INVENTION

A first image processing apparatus of the present invention is an apparatus that performs image processing for eliminating noise from a digital image with edges maintained intact, the apparatus comprising:

an input means for accepting input of a digital image;

a noise amount determination unit for determining the amount of noise in the digital image, and setting noise elimination power that indicates a noise elimination level;

a noise suppression unit for eliminating the noise from the digital image based on the noise elimination power determined by the noise amount determination unit; and an output means for outputting the digital image processed for the noise suppression, wherein the noise amount determination unit includes:

a chrominance component separation unit for separating chrominance components from the digital image;

a frequency transformation unit for transforming each of the separated chrominance components into the frequency domain; and a noise elimination power setting unit for calculating the amount of noise from each of the chrominance components transformed into the frequency domain, and setting the noise elimination power according the calculated amounts of noise.

The referent of "noise" as used herein means noise that causes, for example, an inkjet printer to produce a color irregularity, or the like.

That is, it is not the noise that appears as fine gains in which the luminance value varies steeply, but the noise that appears as small amplitude variations in a flat region where the luminance value is substantially constant when a chrominance component is transformed into the frequency domain.

The referent of "noise elimination power" as used herein means a threshold value for distinguishing between noise and edge areas of a digital image, which serves as the filter factor of the filter used in the noise suppression unit.

For example, a configuration may be adopted in which the noise elimination power setting unit sets the noise elimination power based on the ratio of the number of pixels distinguished as noise to the total number of pixels of the digital image. More specifically, a value for high noise suppression effect is set as the noise elimination power if the pixels distinguished as noise amount to a great number, and a value for low noise suppression effect as the noise elimination power if the number of pixels distinguished as noise is small in view of the maintainability of the edges.

The "noise suppression unit" eliminates the noise from the digital image using a filter, such as $\epsilon$-filter or the like, with the threshold value set on the filter as the noise elimination power.

The referent of "chrominance components" as used herein means, for example, Cr and Cb components in YCrCb space that indicates the relationship between the luminance and chrominance components. The use of the "chrominance components" is because the noise eliminated by the present invention, such as a color irregularity or the like, appears in the area where the variation in the luminance component is relatively flat. Thus, it is more efficient to distinguish the noise using the chrominance components (Cr, Cb components) rather than using the luminance component (Y component). Further, the "edge area" which is not the object to be eliminated by the present invention is likely to appear as variations in the luminance value, so that maintainability of the edge areas may be enhanced by precluding the luminance component from the noise discrimination in advance.

A second image processing apparatus of the present invention is an apparatus that performs image processing for eliminating noise from a digital image with edges maintained intact, wherein the noise elimination power setting unit in the noise amount determination unit described above extracts a particular frequency component from each of the chrominance components transformed into the frequency domain, and calculates the amount of noise from the extracted particular frequency component.

A third image processing apparatus of the present invention is an apparatus that performs image processing for eliminating noise from a digital image with edges maintained intact, wherein:

the noise elimination power setting unit of the noise amount determination unit described above includes:

a first LPF for extracting a low frequency component; and a second LPF for extracting low and intermediate frequency components; and the noise elimination power setting unit extracts the intermediate frequency component from the extraction results of the first and second LPFs, and calculates the amount of noise from the extracted intermediate frequency component.

Here, the extraction of "intermediate frequency component" is because of the following reasons.

First, a high frequency component is precluded from the determination of the noise amount since it is likely to contain edge areas in which the luminance value varies widely. Further, it is precluded from the determination of the noise amount of the present invention since it is likely to contain common noise that appears as fine grains in which the luminance value varies steeply, rather than the noise that causes a color irregularity or the like which is eliminated by the present invention.

The low frequency component is precluded from the determination of the noise amount since it does not contain any area to be discriminated as noise in the first place.

A fourth image processing apparatus of the present invention is an apparatus that performs image processing for eliminating noise from a digital image with edges maintained intact, wherein the noise elimination power setting unit of the noise amount determination unit described above further extracts a pixel with a contrast value that falls within a particular contrast range from the extracted intermediate frequency component to calculate the number of extracted pixels as the amount of noise.

The referent of "particular contrast range" as used herein means a range in which the frequency component takes relatively small amplitude values. The extraction of the particular contrast range is because the noise that causes a color irregularity or the like eliminated by the present invention appears in the flat region as described above and has small luminance variations.

The "particular contrast range" may be redefined as the "low contrast range that precludes those below or equal to a certain predetermined value" in order not to discriminate the amplitude values smaller than or equal to a certain predetermined value as noise even within the "range in which the frequency component takes relatively small amplitude values".

A first image processing method of the present invention is an image processing method for eliminating noise from a digital image with edges maintained intact, the method comprising the steps of:

(1) accepting input of a digital image;

(2) determining the amount of noise in the digital image, and setting noise elimination power that indicates a noise elimination level;

(3) suppressing the noise in the digital image by eliminating the noise therefrom based on the determined noise elimination power; and (4) outputting the digital image processed for the noise suppression, wherein the step (2) comprises the steps of:

(a) separating chrominance components from the digital image;

(b) transforming each of the separated chrominance components into the frequency domain; and (c) calculating the amount of noise from each of the chrominance components transformed into the frequency domain, and (d) setting the noise elimination power according the calculated amounts of noise.

A second image processing method of the present invention is a method for eliminating noise from a digital image with edges maintained intact, wherein the step of calculating the amount of noise from each of the chrominance components transformed into the frequency domain (step (c)) described above comprises the steps of:

(a) extracting a particular frequency component from each of the chrominance components transformed into the frequency domain, and (b) calculating the amount of noise from the extracted particular frequency component.

A third image processing method of the present invention is a method for eliminating noise from a digital image with edges maintained intact, wherein the step of calculating the amount of noise from each of the chrominance components transformed into the frequency domain (step (c)) described above comprises the steps of:

(a) extracting a low frequency component using a first LPF;

(b) extracting low and intermediate frequency components using a second LPF;

(c) extracting only the intermediate frequency component from the extraction results of the first and second LPFs, and (d) calculating the amount of noise from the extracted intermediate frequency component.

A fourth image processing method of the present invention is a method for eliminating noise from a digital image with edges maintained intact, wherein the step of calculating the amount of noise from the extracted intermediate frequency component (step (d)) described above comprises the step of extracting a pixel with a contrast value that falls within a particular contrast range from the extracted intermediate frequency component to calculate the number of extracted pixels as the amount of noise.

The image processing method of the present invention may be provided as a program for causing a computer to execute the image processing method of the present invention.

According to the image processing method and apparatus of the present invention, the amount of noise is determined using chrominance components transformed into the frequency domain. Thus, the noise that causes a color irregularity or the like eliminated by the present invention may be distinguished from the edges which are likely to appear in the luminance component so that both the noise suppression and edge maintainability may be secured.

Further, calculation of the amount of noise from a particular frequency component allows efficient and accurate calculation of the noise that causes a color irregularity or the like eliminated by the present invention. This allows an appropriate threshold value (filter factor) to be set for noise suppression.

In particular, the use of the intermediate frequency component as the particular frequency component allows more accurate discrimination and efficient calculation of the noise. This allows an appropriate threshold value (filter factor) to be set for noise suppression.

Further, calculation of the amount of noise using a pixel with a contrast value that falls within a particular contrast range in the intermediate frequency component allows the efficiency and accuracy of the noise calculation to be improved still further.

The image processing apparatus and method described above allows noise suppression with edges maintained intact by setting an appropriate filter factor, thereby more accurate image may be obtained.

BRIEF DESCRIPTION OF THE DRAWINGS

FIG. 2 is a flowchart of the image processing method according to an embodiment of the present invention, illustrating the process flow thereof.

DESCRIPTION OF THE PREFERRED EMBODIMENTS

Figure 1:
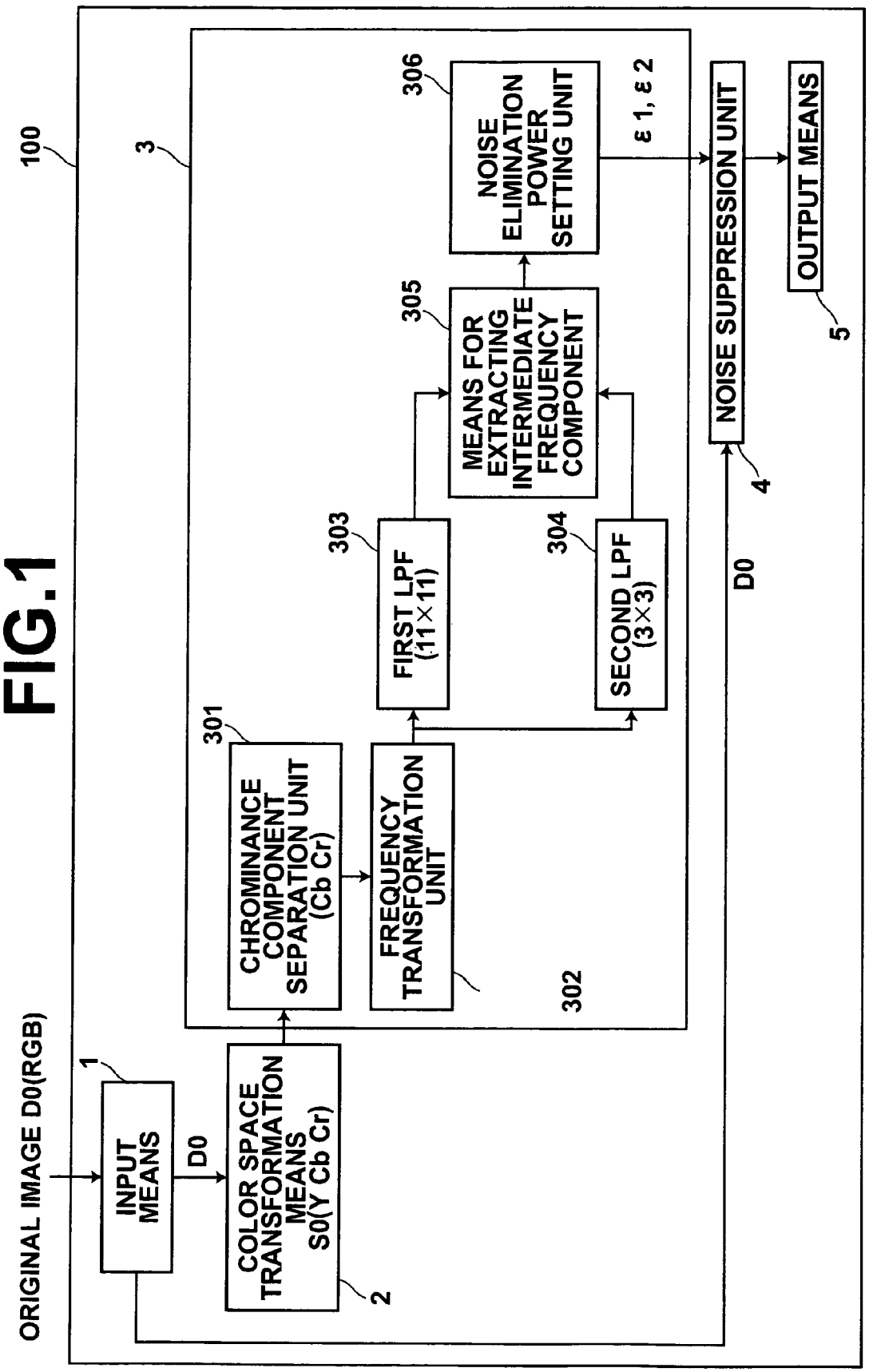
FIG. 1 is a block diagram of the image processing apparatus 100 according to an embodiment of the present invention, illustrating the construction thereof.

Hereinafter, embodiments of the present invention will be described with reference to the accompanying drawings. An image processing apparatus of the present invention may be realized, for example, by a computer (personal computer) having an image processing program installed therein for suppressing noise in a digital image with edges maintained intact. Here, the image processing program may be installed in the computer from an information recording medium, such as a CD-ROM or the like, or from a network, such as the Internet or the like, that distributes the program.

As shown in FIG. 1, the image processing apparatus of the present embodiment includes: an input means 1 for accepting input of an original digital image D0 (e.g., represented in RGB); a color space transformation means 2 for performing, for example, YCbCr transformation on the image D0 to obtain an image S0; a noise amount determination unit 3 for calculating the amount of noise using chrominance components (Cb, Cr) of the image S0 and setting a threshold value used for distinguishing between noise and edge areas; a noise suppression unit 4 for eliminating noise according to the threshold value set by the noise amount determination unit; and an output means for outputting the image processed for the noise suppression.

Here, the image D0 accepted by the input means 1 may be an image that uses color spaces other than RGB. The color space transformation means 2 may be any means as long as it is capable of transforming one color space into another including, for example, from RGB space to YCbCr space according to the Formula (1) shown below, or from RGB space to LC1C2 space according to the Formula (2) shown below. Preferably, however, the image S0 obtained by the color space transformation means 2 is an image having "chrominance" as the component in view of the nature of the noise (color irregularity) removed by the present invention.

$$Y=0.299 \times R+0.587 \times G+0.114 \times B$$

$$Cr=0.500 \times R-0.419 \times G-0.081 \times B$$

$$Cb=-0.169 \times R-0.331 \times G-0.500 \times B \quad (1)$$

where,
Y: luminance value
Cr, Cb: chrominance values, and
R, G, B: R, G, and G values respectively.

$$Y=0.299 \times R+0.587 \times G+0.114 \times B$$

$$C1=-0.299 \times R-0.587 \times G+0.886 \times B$$

$$C2=0.701 \times R-0.587 \times G-0.114 \times B \quad (2)$$

where,
L: luminance value
C1, C2: chrominance values, and
R, G, B: R, G, and G values respectively.

Hereinafter, the noise amount determination unit 3 will be described in detail. The noise amount determination unit includes: a chrominance component separation unit 301 for separating only chrominance components (e.g., Cb, Cr) from the image S0; a frequency transformation unit 302 for transforming each of the separated chrominance components into the frequency domain; a first LPF 303 for extracting only a low frequency component from each of the chrominance components transformed into the frequency domain. It further includes: a second LPF 304 for extracting low and intermediate frequency components; a means 305 for extracting only the intermediate frequency component from the outputs of the first LPF 303 and the second LPF 304; and noise elimination power setting unit 306 for extracting a pixel with a contrast value that falls within a particular contrast range from the intermediate frequency component to calculate the amount of noise, and determining noise elimination power (a threshold value used as the filter factor) used by the noise suppression unit 4 according to the calculated amount of noise.

The use of only the chrominance components of the image S0 in the noise amount determination unit 3 is because of the nature of the noise (color irregularity) which is eliminated by the present invention. For example, a color irregularity produced by an inkjet printer appears in the "flat region" where luminance variation is small, which is the noise resulting from ill-balanced amounts of inks (colors) used. Accordingly, the use of the chrominance components for noise discrimination allows more accurate noise identification. Further, edges are represented by the variations in the luminance value, so that erroneous determination of an edge as noise may be avoided by precluding the luminance component (e.g. Y component) from the noise discrimination in advance.

Further, the extraction of only the intermediate frequency component after each of the chrominance components are transformed into the frequency domain in the noise amount determination unit 3 is also because of the nature of the noise (color irregularity) which is eliminated by the present invention. For example, the noise appearing as fine grains in which the luminance value varies steeply is observed disproportionately in the high frequency component, which is, therefore, precluded by the two LPF (303, 304) in advance. In addition, the low frequency component where the variation of chrominance value is very small is precluded from the noise discrimination. This allows more efficient arithmetic operation.

The noise eliminated by the present invention is the noise with a smaller chrominance variation than the typical noise, yet with a chrominance variation value that should be determined as the noise, so that the intermediate frequency component is extracted for calculating the amount of noise. In the present embodiment, an 11×11 filter, and a 3×3 filter are used as the LPF 303 and 304 respectively. But, any filter may be used as long as it is capable of extracting an appropriate intermediate frequency component.

Further, the reason for extracting a pixel with a contrast value that falls within a particular contrast range to calculate the amount of noise in the noise elimination power setting unit 306 of the noise amount determination unit 3 is to improve the accuracy of the noise discrimination by extracting frequencies having certain amplitudes from the frequency component since the noise (color irregularity) which is eliminated by the present invention is the noise with a comparatively smaller chrominance variation.

Still further, the noise elimination power setting unit 306 may be a unit, for example, that calculates the ratio of the number of pixels distinguished as noise to the total number of pixels of the digital image as the amount of noise, or a unit that calculates the number of pixels itself discriminated as noise as the amount of noise. The noise elimination power setting unit 306 further set an appropriate threshold value for distinguishing between noise and edge areas. The noise elimination power setting unit 306 shown, as an example, in FIG. 1 is capable of setting two different threshold values ($\epsilon 1$ and $\epsilon 2$) according to the ratio of the number of pixels distinguished as noise to the total number of pixels of the digital image. Here, the noise elimination power setting unit 306 may be constructed to set more threshold values. Then, more accurate noise suppression and edge maintainability may be achieved, and thereby more accurately processed image is obtained. Here, for example, if the ratio of the pixels distinguished as noise to the total number of pixels is less than N % in both Cb and Cr components, $\epsilon 1$ for low noise elimination power may be set as the threshold value, and if the ratio is grater than or equal to N % in at least either of Cb or Cr component, $\epsilon 2$ for high noise elimination power may be set as the threshold value.

The noise suppression unit 4 suppresses the noise of the digital image based on the threshold value set by the noise elimination power setting unit 306. More specifically, a $\epsilon$-filter is applied to the image D0 accepted by the input means 1 with the threshold value ($\epsilon 1$ or $\epsilon 2$) set by the noise elimination power setting unit 306 as the filter factor. The $\epsilon$-filter maintains a signal intact that varies greater than or equal to a certain predetermined value, and smoothes a signal that varies smaller than the predetermined value. Thus, the $\epsilon 1$ or $\epsilon 2$ set by the noise power setting unit 306 serves as the threshold value that determines whether the signal value is maintained or smoothed. Apart from the $\epsilon$-filter described above, $\epsilon$-filter or median filter which is also capable of eliminating small amplitude noise superimposed on a steeply varying signal may be used for noise suppression. The use of $\epsilon$-filter is desirable, however, from the viewpoint of ease of circuit design and signal smoothing capability.

The output means 5 is a means for outputting the image processed for the noise suppression. For example, if the image processing apparatus of the present embodiment is an apparatus realized with a computer (personal computer) and an image processing program installed therein for suppressing noise in a digital image with edges maintained intact, then the output means 5 corresponds to the monitor of the computer. If the image processing apparatus of the present embodiment is an apparatus realized with a digital camera and an image processing program installed therein for suppressing noise in a digital image with edges maintained intact, then the output means 5 corresponds to the monitor of the digital camera.

Hereinafter, an image processing method according to the present invention will be described with reference to FIG. 2. The image processing method of the present invention may be realized, for example, by causing a computer (personal computer) to execute an image processing program installed therein for suppressing noise in a digital image with edges maintained intact.

First, the input of the original digital image D0 (e.g., represented in RGB) is accepted (Step 101). If the original image D0 is a digital image represented in RGB values, it is transformed into another color space that includes chrominance components (e.g. YCbCr space or LC1C2 space) to obtain the image S0 (Step 102). Specific transformation formulae have already been described. For example, Formula (1) or Formula (2) described earlier may be used. If the original image D0 is already represented in a color space that includes chrominance components, no color space transformation process is performed, and the following process steps are performed with the image D0 deemed as the image S0.

Then, only the chrominance components are separated from the image S0 (Step 103). The use of only the chrominance components of the image S0 in the following steps is because of the nature of the noise eliminated by the present invention, such as the noise like a color irregularity produced by an inkjet printer. Such color irregularity occurs in the flat region where luminance value (e.g. Y component value in YCbCr space) is substantially constant arising from ill-balanced amounts of inks, so that such noise is more likely to appear as the variation in the value of the chrominance components.

Then, each of the chrominance components is transformed into the frequency domain (Step 104). That is, if the chrominance components Cr and Cb are present, each of the components is transformed into the frequency domain.

Then, an intermediate frequency component is extracted from the chromatic component transformed into the frequency domain (Step 105). More specifically, a low frequency component is extracted by an 11×11 LPF filter. At the same time, low and intermediate frequency components are extracted by a 3×3 LPF filter. Then, only the intermediate frequency component is extracted based on the two extraction results. The extraction of only the intermediate frequency is because of the nature of the noise eliminated by the present invention. That is, the noise that causes an inkjet printer to produce a color irregularity has a comparatively smaller chrominance component variation. The noise appearing as fine grains in which the luminance value varies steeply is observed disproportionately in the high frequency component. Therefore, the high frequency component is precluded from the nose discrimination. In addition, the low frequency component where the variation of chrominance value is very small is precluded from the noise discrimination. This allows more efficient arithmetic operation.

Then, a pixel with an amplitude value that falls within a certain amplitude range is extracted from the extracted intermediate frequency component (Step 106). This means that only a pixel with a contrast value that falls within a particular contrast range is extracted. This is because the noise eliminated by the present invention has a property that the value of the chrominance components neither varies steeply nor is flat, and falls within a particular range.

The number of pixels extracted, or the ratio of the number of extracted pixels to the total number of pixels of the digital image is calculated as the amount of noise (Step 107), and the threshold value used for distinguishing between noise and edge areas is determined according to the calculated noise amount (Step 108). The threshold value indicates the noise elimination power in the noise suppression to be described later. For example, either of two different threshold values ($\epsilon 1$ or $\epsilon 2$) may be set according to the ratio of the number of pixels distinguished as noise to the total number of pixels of the digital image. It is also possible to provide more threshold values, in which case more accurate noise suppression and edge maintainability may be achieved, and thereby more accurately processed image is obtained. Here, for example, if the ratio of the pixels distinguished as noise to the total number of pixels is less than N % in both Cb and Cr components, $\epsilon 1$ for low noise elimination power may be set as the threshold value, and if the ratio is grater than or equal to N % in at least either of Cb or Cr component, $\epsilon 2$ for high noise elimination power may be set as the threshold value.

Then, the noise suppression is performed on the original image D0 using the selected threshold value (Step 109). More specifically, performing noise suppression means to apply a $\epsilon$-filter to the image D0 using the selected threshold value ($\epsilon 1$ or $\epsilon 2$) as the filter factor. The $\epsilon$-filter maintains a signal intact that varies greater than or equal to a certain predetermined value, and smoothes a signal that varies smaller than the predetermined value. Thus, selected $\epsilon 1$ or $\epsilon 2$ serves as the threshold value that determines whether the signal value is maintained or smoothed. Apart from the $\epsilon$-filter described above, $\epsilon$-filter or median filter which is also capable of eliminating small amplitude noise superimposed on a steeply varying signal may be used for noise suppression. The use of $\epsilon$-filter is desirable, however, from the viewpoint of ease of circuit design and signal smoothing capability.

Finally, the processed image the noise suppression is outputted to the monitor of the computer (Step 110).

In this way, the image processing apparatus and method of the present invention is capable of setting an appropriate threshold value according to the amount of noise present in a digital image. Thus, a more accurate image may be obtained by suppressing the noise with edges maintained intact.

In particular, the use of the chrominance components in the calculation of the amount of noise in line with the nature of the noise eliminated by the present invention allows more accurate calculation of the noise with a less amount of arithmetic operation.

Further, the use of a particular frequency component after transforming the chrominance components into the frequency domain in the noise calculation also allows more accurate calculation for the amount of noise with a less amount of arithmetic operation.

Still further, extraction of a pixel with a contrast value that falls within a particular contrast range from a particular frequency component allows more accurate identification of the pixels having noise.

So far the preferred embodiments of the present invention have been described. It will be appreciated, however, that the present invention is not limited to the embodiments described above, and various modification and additions/subtractions may be made without departing from the spirit of the present invention.

For example, the $\epsilon$-filter is used as the noise suppression unit in the embodiments. Apart from the $\epsilon$-filter, however, $\epsilon$-filter or Median filter which is also capable of eliminating small amplitude noise superimposed on a steeply varying signal may be used for the noise suppression.

Further, when extracting the intermediate frequency component after transforming the chrominance components into the frequency domain, an 11×11 LPF filter, and a 3×3 LPF filter are used in the embodiments. But, LPFs with other sizes may be combined and used for the extraction of the intermediate frequency component.

Still further, when extracting a pixel with a contrast value that falls within a particular contrast range from the extracted intermediate frequency component, the upper and lower limits of the particular contrast range may be preset according to the property of the inkjet printer to be used, or automatically calculated from the statistical value of the amplitude of each of the pixels. Alternatively, these values may be inputted by the user.

What is claimed is:

1. An image processing apparatus for eliminating noise from a digital image with edges maintained intact, the apparatus comprising:
   an input means for accepting input of a digital image;
   a noise amount determination unit for determining the amount of noise in the digital image, and setting noise elimination power that indicates a noise elimination level;
   a noise suppression unit for eliminating the noise from the digital image based on the noise elimination power determined by the noise amount determination unit; and
   an output means for outputting the digital image processed for the noise suppression, wherein the noise amount determination unit includes:
   a chrominance component separation unit for separating chrominance components from the digital image;
   a frequency transformation unit for transforming each of the separated chrominance components into the frequency domain; and
   a noise elimination power setting unit for calculating the amount of noise from each of the chrominance components transformed into the frequency domain, and setting the noise elimination power according the calculated amounts of noise, wherein:
   the noise elimination power setting unit includes:
   a first low pass filter (LPF) for extracting a low frequency component; and
   a second LPF for extracting low and intermediate frequency components; and
   the noise elimination power setting unit extracts the intermediate frequency component from the extraction results of the first and second LPFs, and calculates the amount of noise from the extracted intermediate frequency component.

2. The image processing apparatus according to claim 1, wherein the noise elimination power setting unit further extracts a pixel with a contrast value that falls within a particular contrast range from the extracted intermediate frequency component to calculate the number of extracted pixels as the amount of noise.

3. The image processing apparatus according to claim 1, wherein the noise elimination power setting unit further extracts a pixel with a contrast value that falls within a particular contrast range from the extracted intermediate frequency component to calculate the ratio of the number of extracted pixels to the total number of pixels of the digital image as the amount of noise.

4. The image processing apparatus according to any of claims 1 to 3, wherein the noise suppression unit suppresses the noise using a $\epsilon$-filter.

5. An image processing method for eliminating noise from a digital image with edges maintained intact, the method comprising the steps of:

(1) accepting input of a digital image;
(2) determining the amount of noise in the digital image, and setting noise elimination power that indicates a noise elimination level;
(3) suppressing the noise in the digital image by eliminating the noise therefrom based on the determined noise elimination power; and
(4) outputting the digital image processed for the noise suppression, wherein the step (2) comprises the steps of:
(a) separating chrominance components from the digital image;
(b) transforming each of the separated chrominance components into the frequency domain; and
(c) calculating the amount of noise from each of the chrominance components transformed into the frequency domain, and
(d) setting the noise elimination power according the calculated amounts of noise, wherein the step (c) comprises the steps of:
(a) extracting a low frequency component using a first LPF;
(b) extracting low and intermediate frequency components using a second LPF;
(c) extracting only the intermediate frequency component from the extraction results of the first and second LPFs, and
(d) calculating the amount of noise from the extracted intermediate frequency component.

6. The image processing method according to claim 5, wherein the step (d) comprises the step of extracting a pixel with a contrast value that falls within a particular contrast range from the extracted intermediate frequency component to calculate the number of extracted pixels as the amount of noise.

7. The image processing method according to claim 5, wherein the step (d) comprises the step of extracting a pixel with a contrast value that falls within a particular contrast range from the extracted intermediate frequency component to calculate the ratio of the number of extracted pixels to the total number of pixels of the digital image as the amount of noise.

8. The image processing method according to any of claims 5 to 7, wherein the step (3) suppresses the noise using a $\epsilon$-filter having a filter factor determined based on the noise elimination power.

9. A tangible non-transitory computer-readable medium including a program for causing a computer to execute an image processing method for eliminating noise from a digital image with edges maintained intact, the method comprising the steps of:

(1) accepting input of a digital image;
(2) determining the amount of noise in the digital image, and setting noise elimination power that indicates a noise elimination level;
(3) suppressing the noise in the digital image by eliminating the noise therefrom based on the determined noise elimination power; and
(4) outputting the digital image processed for the noise suppression, wherein the step (2) comprises:
(a) separating chrominance components from the digital image;
(b) transforming each of the separated chrominance components into the frequency domain; and
(c) calculating the amount of noise from each of the chrominance components transformed into the frequency domain, and (d) setting the noise elimination power according the calculated amounts of noise, wherein the step (c) comprises the steps of:
(a) extracting a low frequency component using a first LPF;
(b) extracting low and intermediate frequency components using a second LPF;
(c) extracting only the intermediate frequency component from the extraction results of the first and second LPFs, and
(d) calculating the amount of noise from the extracted intermediate frequency component.

10. The medium according to claim 9, wherein the step (d) comprises the step of extracting a pixel with a contrast value that falls within a particular contrast range from the extracted intermediate frequency component to calculate the number of extracted pixels as the amount of noise.

11. The medium according to claim 9, wherein the step (d) comprises the step of extracting a pixel with a contrast value that falls within a particular contrast range from the extracted intermediate frequency component to calculate the ratio of the number of extracted pixels to the total number of pixels of the digital image as the amount of noise.

12. The medium according to any of claims 9 to 11, wherein the step (3) suppresses the noise using a $\epsilon$-filter having a filter factor determined based on the noise elimination power.

* * * * *